US012508318B2

(12) United States Patent
Yin et al.

(10) Patent No.: US 12,508,318 B2
(45) Date of Patent: Dec. 30, 2025

(54) UV LIGHT-RESPONSIVE HYPERBRANCHED POLY-β-AMINO ESTER HAVING HIGH-EFFICIENCY GENE DELIVERY ABILITY AND PREPARATION METHOD AND APPLICATION THEREOF (71) Applicant: SOOCHOW UNIVERSITY, Suzhou (CN)

(72) Inventors: Lichen Yin, Suzhou (CN); Desheng Cao, Suzhou (CN); Shanzhou Duan, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 892 days.

(21) Appl. No.: 17/765,084

(22) PCT Filed: Sep. 29, 2020

(86) PCT No.: PCT/CN2020/119120
§ 371 (c)(1),
(2) Date: Mar. 30, 2022

(87) PCT Pub. No.: WO2021/063376
PCT Pub. Date: Apr. 8, 2021

(65) Prior Publication Data
US 2023/0000992 A1 Jan. 5, 2023

(30) Foreign Application Priority Data
Sep. 30, 2019 (CN) .......................... 201910945839.5

(51) Int. Cl.
A61K 47/42 (2017.01)
A61K 31/7105 (2006.01)

(52) U.S. Cl.
CPC .......... A61K 47/42 (2013.01); A61K 31/7105 (2013.01)

(58) Field of Classification Search
CPC .......................... A61K 47/42; A61K 31/7105
See application file for complete search history.

(56) References Cited

U.S. PATENT DOCUMENTS

2017/0216455 A1    8/2017   Wang et al.

FOREIGN PATENT DOCUMENTS

| CN | 103243122 A | 8/2013 |
| CN | 108524946 A | 9/2018 |
| CN | 109988780 A | 7/2019 |
| CN | 110746599 A | 2/2020 |
| CN | 102627767 A | 8/2021 |

OTHER PUBLICATIONS

Duan et al., "Topology-assisted, photo-strengthened DNA/siRNA delivery mediated by branched poly(β-amino ester)s via synchronized intracellular kinetics", 2020, published Oct. 4, 2019, Biomaterials Science, vol. 8, pp. 290-301 and S1-S14. (Year: 2019).*

* cited by examiner

Primary Examiner — Michael B. Pallay
(74) Attorney, Agent, or Firm — SZDC Law PC (57) ABSTRACT Provided are a UV light-responsive hyperbranched poly-β-amino ester having high-efficiency gene delivery ability and a preparation method and application thereof; said poly-β-amino ester uses 4-amino-1-butanol, 2-nitro-1, M-phthaloyl 3-diacrylate, trimethylolpropane triacrylate, and 1-(3-aminopropyl)-4-methylpiperazine as raw materials, is polymerized by means of the "A2+B3+C2" Michael addition method, causing it to have a hyperbranched structure. In comparison with a linear structure, the branched structure enhances the interaction between the polymer and the nucleic acid molecule, significantly improving gene condensation ability, while also increasing cellular uptake by means of enhancing the interaction with the cell membrane. The poly-β-amino ester has a UV-responsive group on the backbone chain; under UV light irradiation, the poly-β-amino ester can be rapidly degraded after endocytosis, and releases the encapsulated genes, and achieves efficient gene transfection and reduces material toxicity. The invention has good prospects for development in the field of biomedical materials, and particularly in gene delivery.

9 Claims, 8 Drawing Sheets

| Polymer | the number average molecular weigh | the weight average molecular weight | Molecular weight distribution coefficient |
|---|---|---|---|
| LPAE | 16800 | 22700 | 1.35 |
| BPAE-NB | 18100 | 33100 | 1.83 |
| BPAE-CC | 15400 | 26400 | 1.71 |

UV LIGHT-RESPONSIVE HYPERBRANCHED POLY-β-AMINO ESTER HAVING HIGH-EFFICIENCY GENE DELIVERY ABILITY AND PREPARATION METHOD AND APPLICATION THEREOF

This application is the National Stage Application of PCT/CN2020/119120, filed on Sep. 29, 2020, which claims priority to Chinese Patent Application No. 201910945839.5, filed on Sep. 30, 2019, which is incorporated by reference for all purposes as if fully set forth herein.

TECHNICAL FIELD

The invention relates to the field of gene loading and delivery, and particularly a UV-responsive branched poly(β-amino ester)s with high gene delivery efficiency, preparation method and application thereof, and application in DNA/siRNA transfection.

BACKGROUND TECHNIQUE

Gene vectors materials are important tools for loading genes, delivering them into target cells and successfully expressing them. Gene vectors materials can be divided into two types: viral vectors and non-viral vectors. Viral vectors have the advantage of high transfection efficiency, but their own shortcomings such as high immunogenicity, high carcinogenic risk and low gene loading have severely restricted their application and development. Based on this, non-viral vectors have gradually gained attention and development. Commonly used non-viral vectors include liposomes, nanoparticles, cationic polymers and polysaccharides. Existing gene vectors are limited by their structure and require a higher mass ratio to effectively condense nucleic acids, which may cause higher cytotoxicity.

Technical Problem

The object of the present invention is to provide a UV-responsive branched poly(β-amino ester)s which is used as a nucleic acid carrier and has good biocompatibility, UV light sensitivity and high gene transfection, it also provides a preparation method of binding nucleic acid with the above-mentioned UV-responsive branched poly(β-amino ester)s, and its application in a nucleic acid drug delivery system.

The present invention provides a UV-responsive branched poly(β-amino ester)s, is synthesized via Michael addition reaction, end-capping with small molecule amine for blocking agent; the branching monomer is utilized to form the highly branched architecture.

There have been UV-responsive groups on the backbone chain of the cationic of poly(β-amino ester)s.

Technical Solutions

In order to achieve the above-mentioned object of the invention, the technical solution adopted by the present invention is: UV-responsive branched poly(β-amino ester)s, have the chemical structure of Formula (I):

Formula (I)

In formula (I), x is from 7 to 15, y is from 7 to 13, z is from 6 to 10; preferably, x is from 9 to 11, y is from 8 to 10, z is from 7 to 9.

The present invention provides a method for preparing the above-mentioned UV-responsive branched poly(β-amino ester)s with the structure of Formula (I). The memthod includes the following steps: preparing UV-responsive branched poly(β-amino ester)s with 4-amino-1-butanol, (2-nitro-1,3-phenylene)bis(methylene) diacrylate, trimethylolpropane triacrylate, 1-(3-aminopropyl)-4-methylpiperazine as raw materials.

The present invention discloses a method for preparing for nano-medicine. The method includes the following steps: preparing UV-responsive branched poly(β-amino ester)s with 4-amino-1-butanol, (2-nitro-1,3-phenylene)bis (methylene) diacrylate, trimethylol-propane triacrylate, 1-(3-aminopropyl)-4-methylpiperazine as raw materials; prepare a nano-medicine by combining the UV-responsive branched poly(β-amino ester)s with a drug. Specifically, the UV-responsive branched poly(β-amino ester)s are dissolved in acetic acid buffer solution, a nucleic acid solution is added, incubating at 37° C. to obtain the nano-medicine.

In the present invention, 4-amino-1-butanol, (2-nitro-1,3-phenylene)bis(methylene) diacrylate, trimethylolpropane triacrylate are reacted at from 50° C. to 60° C., and then 1-(3-aminopropyl)-4-methylpiperazine is added at room temperature, to prepare the UV-responsive branched poly (β-amino ester)s. Preferably, a molar ratio of (2-nitro-1,3-phenylene)bis-(methylene) diacrylate, trimethylolpropane triacrylate, 4-amino-1-butanol, 1-(3-aminopropyl)-4-methylpiperazine is 0.6:0.25:1:1, and reaction is conducted at from 50° C. to 60° C. for 5 to 8 h, a reaction time at room temperature is 12 h.

In the present invention, 2,6-dimethylnitrobenzene and an oxidant are used as raw materials to prepare 2-nitro-1,3-phthalic acid; 2-nitro-1,-phthalic acid and borane are used as raw materials to prepare 2-nitro-1,3-benzenedimethanol; 2-nitro-1,3-benzenedimethanol and acryloyl chloride are used as raw materials to prepare (2-nitro-1,3-phenylene)-bis (methylene) diacrylate. Preferably, the oxidant is potassium permanganate; under the catalysis of amine, 2-nitro-1,3-benzenedimethanol and acryloyl chloride are used as raw materials to prepare (2-nitro-1,3-phenylene)bis(methylene) diacrylate.

Specifically, a method for preparing the UV-responsive branched poly(β-amino ester)s with the structure of Formula (I) in invention includes the following steps: (1) 2,6-dimethylnitrobenzene and potassium permanganate are used as raw materials to prepare 2-nitro-1,3-phthalic acid; (2) 2-nitro-1,3-phthalic acid and borane are used as raw materials to prepare 2-nitro-1,3-benzenedimethanol; (3) 2-nitro-1,3-benzenedimethanol and acryloyl chloride are used as raw materials to prepare (2-nitro-1,3-phenylene)bis(methylene) diacrylate. (4) 4-amino-1-butanol, (2-nitro-1,3-phenylene)bis (methylene) diacrylate, trimethylolpropane triacrylate, 1-(3-aminopropyl)-4-methylpiperazine are used as raw materials to prepare UV-responsive branched poly(β-amino ester)s.

In the above technical scheme: in step (1), the solvent of the reaction is water, the reaction is refluxed at 95° C. for 24 h, the pH of the resulting product is adjusted to 1 with hydrochloric acid, and the reaction is carried out in the presence of sodium hydroxide; the chemical structure of 2-nitro-1,3-phthalic acid is:

In step (2), anhydrous tetrahydrofuran is used as the reaction solvent, and the reaction is performed at room temperature for 48 h, and the chemical structure of the 2-nitro-1,3-benzenedimethanol is:

In step (3), the reaction solvent is dichloromethane, and the catalyst is triethylamine; the structural formula of the (2-nitro-1,3-phenylene)bis(methylene) diacrylate is:

The above specific reaction can be expressed as follows:

The UV-responsive branched poly(β-amino ester)s provided by the present invention can self-assemble with nucleic acid to form the nano-medicine. Therefore, the present invention discloses the nano-medicine obtained from the above-mentioned UV-responsive branched poly(β-amino ester)s composite medicine.

In the present invention, the drug is a nucleic acid; the nucleic acid is selected from DNA or RNA.

In the present invention, the DNA is plasmid DNA, which can express protein or be transcribed into small interfering RNA.

In the present invention, a mass ratio of UV-responsive branched poly(β-amino ester)s and nucleic acid is (0.5 to 50):1. Preferably, the mass ratio is (10 to 50):1. More preferably, the mass ratio is (15 to 30):1.

In the present invention, the particle size of nano-medicine is from 120 to 800 nm; preferably, the particle size is from 120 to 200 nm; more preferably, the particle size is from 120 to 170 nm.

The UV-responsive branched poly(β-amino ester)s provided by the present invention are applied to preparation of drug carriers or nano-medicines; or the nano-medicine is applied to preparation of gene drugs.

Beneficial Effects

The main advantages of the present invention are, (1) The present invention introduces trimethylolpropane triacrylate into the structure of poly(β-amino ester)s, so that the polymer has the highly branched architecture, and the highly branched architecture has the following advantages: 1 The poly(β-amino ester)s with higher density of tertiary amine can significantly enhance the electrostatic interaction between the polymer and the nucleic acid molecule, and effectively condense the nucleic acid molecule at a lower mass ratio; 2 branched polymer with three-dimensional structure can be modified with terminal groups with specific structures and functions give polymers various specific functions.

(2) The UV-responsive branched poly(β-amino ester)s provided by the present invention can break the polymer main chain under the trigger of external UV light to realize the degradation of the polymer, thereby reducing the toxicity of the material and significantly improving the transfection efficiency.

(2) The UV-responsive branched poly(β-amino ester)s provided by the present invention has a high positive charge density, promotes the interaction between the material and the cell membrane, and further promotes the endocytosis of the material.

DESCRIPTION OF FIGURES

The accompanying drawings are used to provide a further understanding of the present invention and constitute a part of the specification. Together with the following specific embodiments, they are used to explain the present invention, but do not constitute a limitation to the present invention. In the drawings.

DETAILED DESCRIPTION

The poly(β-amino ester)s of the present invention is a kind of effective cationic gene delivery vector. Its main chain contains hydrolyzable ester bonds. The positively charged tertiary amine can electrostatically interact with the negatively charged nucleic acid to form a nanocomposite. Among them, the cationic polymer can effectively condense nucleic acid molecules through its own positive charge and the negative charge of the nucleic acid molecule through electrostatic interaction. At the same time, it mainly uses the excess positive charge on the surface of the polymer to bind to the cell membrane to promote endocytosis, so it can be used for nucleic acid delivery; research has found that compared with other structures, the polymer structure of the present invention can significantly enhance the interaction between the polymer and the nucleic acid molecule, improve the gene condensation ability, and at the same time can increase cell uptake by enhancing the interaction with the cell membrane. Therefore, the poly(β-amino ester)s with highly branched architecture can more effectively bind nucleic acid molecules to achieve efficient gene transfection, and at the same time, polymers can achieve more controlled release of nucleic acid molecules.

The raw materials used in the present invention are all commercially available products, DNA is plasmid DNA, which is the plasmids extracted from *E. coli* containing expression of luciferase, conventional products, Survivin siRNA are purchased from Gemma Gene.

Example 1

A method for preparing the UV-responsive branched poly(β-amino ester)s, specific steps are as follows:

Added 2,6-dimethylnitrobenzene (15 g, 0.15 mol) to 95° C. NaOH solution and stirred well, then added potassium permanganate (66 g, 0.418 mol), and reflux for 24 h; then the mixture was cooled to room temperature, filtered, and the pH value was adjusted at 1 with hydrochloric acid to obtain 2-nitro-1,3-phthalic acid as a white crystal.

In ice bath, added 1.0 mol of borane (in tetrahydrofuran complex, 400 mL) into 2-nitro-1,3-phthalic acid (16.0 g, 76 mmol) with a syringe under the protection of nitrogen and dissolved in anhydrous tetrahydrofuran, the mixture was obtained; the mixture was heated to room temperature and stirred for 48 h; then methanol (40 mL) was added dropwise, filtered and dried under vacuum, then the dried product was dissolved in ethyl acetate and washed by saturated NaCl solution (4×100 mL), the organic phase was dried with anhydrous magnesium sulfate for 12 h, then the solvent was removed under vacuum, and the yellow solid was obtained further purified by silica gel chromatography (developing solvent: n-hexane/ethyl acetate=1/1), the product is 2-nitro-1,3-benzenedimethanol.

Figure 1:
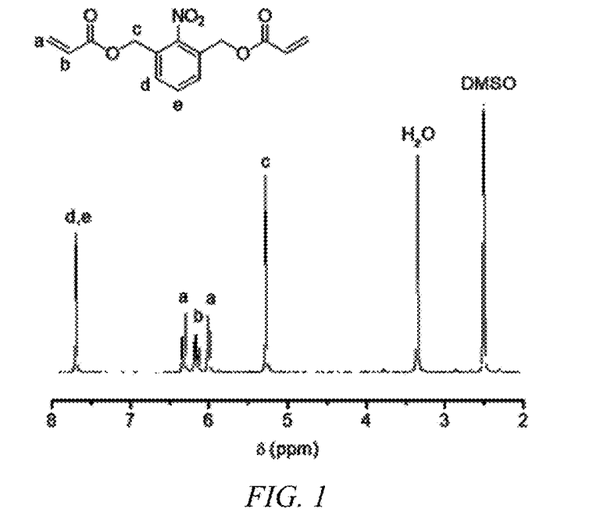
FIG. 1 shows the $^1$H NMR of (2-nitro-1,3-phenylene)bis(methylene) diacrylate of Example 1.

Under nitrogen protection, added triethylamine (100 mmol) into the solution of 2-nitro-1,3-benzenedimethanol (7.3 g, 40 mmol) in anhydrous dichloromethane (50 mL), then added acryloyl chloride with a syringe to obtain a mixture. The mixture was stirred at room temperature for 18 h and then filtered. The filtrate was dried under vacuum. The dried substance was dissolved in ethyl acetate and washed with saturated sodium chloride solution (3×100 mL). The organic layer was dried with anhydrous magnesium sulfate for 12 h, and then the solvent was removed under vacuum. The obtained yellow solid was purified by silica gel chromatography (developing solvent: n-hexane/ethyl acetate=1/1) to obtain (2-nitro-1,3-phenylene)bis(methylene) diacrylate. FIG. 1 shows the $^1$H NMR spectrum.

Example 2

Figure 2:
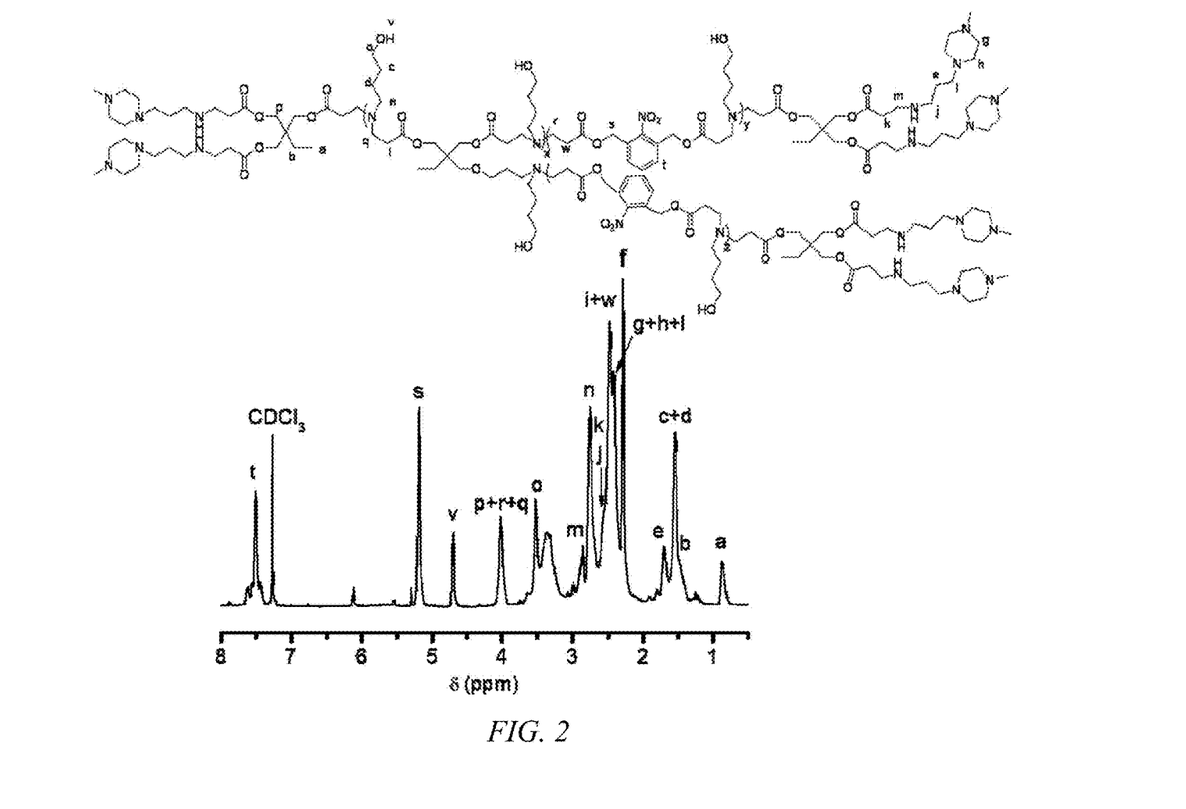
FIG. 2 shows the $^1$H NMR of Example 2.

(2-nitro-1,3-phenylene)bis(methylene) diacrylate (174.6 mg, 0.6 mmol), trimethylol-propane triacrylate (74 mg, 0.25 mmol) and 4-amino-1-butanol (89 mg, 1 mmol) were then mixed and stirred at 60° C. for 8 h. Then 1-(3-aminopropyl)-4-methylpiperazine (157 mg, 1 mmol) in dichloromethane (DCM, 1 mL) was added and stirred at RT for 12 h. Then settled three times with glacial ether, removed the solvent under vacuum, and isolated as a yellowish liquid was UV-responsive branched poly(β-amino ester)s (BPAE-NB), yield 72%. FIG. 2 shows the $^1$H NMR spectrum, x is from 9 to 11, y is from 8 to 10, z is from 7 to 9. The chemical structure of BPAE-NB is as follow,

The MWs of BPAE-NB were determined using gel permeation chromatography (GPC) upon before and after UV irradiation ($\lambda$=365 nm, 20 mW cm$^{-2}$, 10 min).

Figure 3:
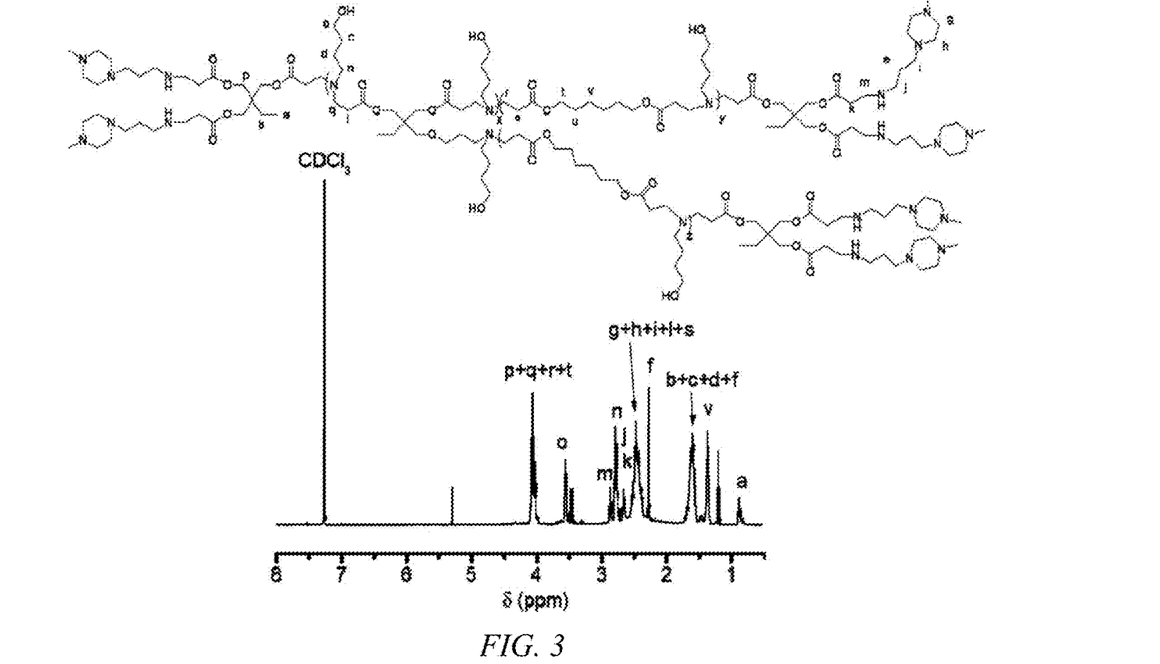
FIG. 3 shows the $^1$H NMR of Control Example 1.
Figure 4:
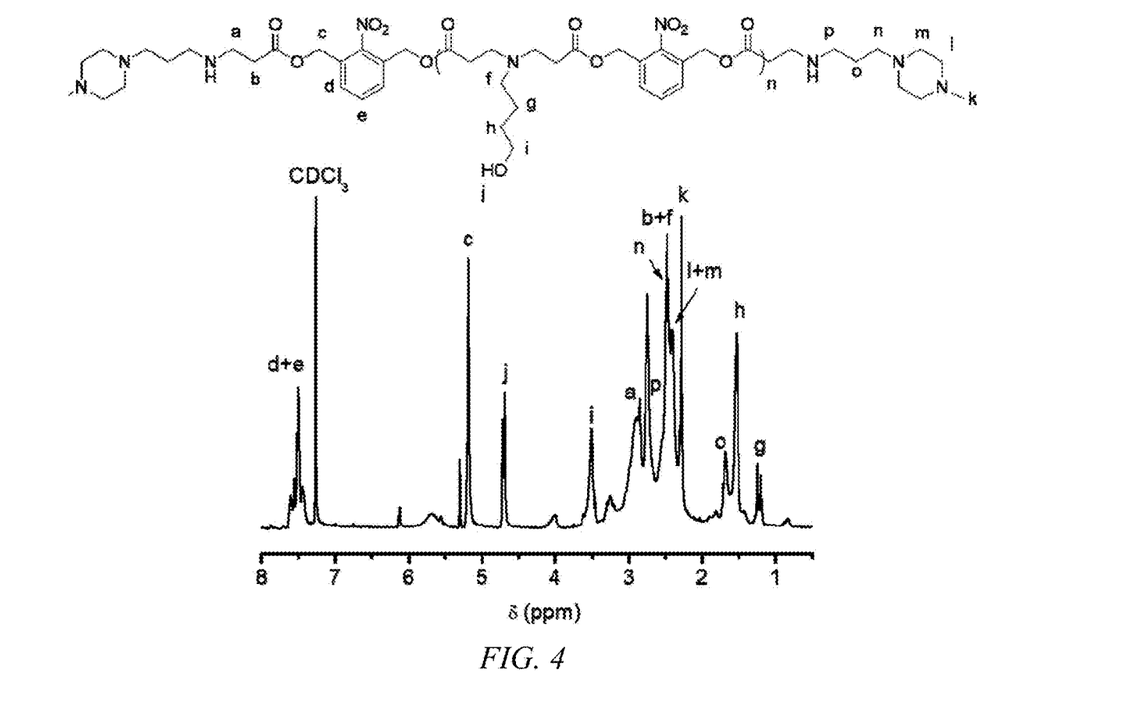
FIG. 4 shows the $^1$H NMR of Control Example 2.
Figure 5:
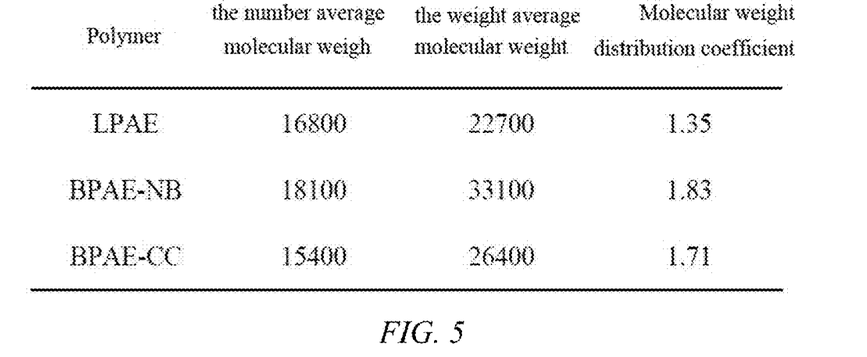
FIG. 5 shows the results of GPC in Example 2, Control Example 1, Control Example 2.

Control Example 1:

1,6-hexanediol diacrylate (188 mg, 0.83 mmol), trimethylolpropane triacrylate (74 mg, 0.25 mmol) and 4-amino-1-butanol (89 mg, 1 mmol) were then mixed and stirred at 60° C. for 8 h. Then 1-(3-aminopropyl)-4-methylpiperazine (157 mg, 1 mmol) in dichloromethane (DCM, 1 mL) was added and stirred at RT overnight. Then settled three times with glacial ether, removed the solvent under vacuum, and isolated as a yellowish liquid was the non-degradable analogue of BPAE-NB, named BPAE-CC. As a positive control, FIG. 3 shows the $^1$H NMR spectrum. The chemical structure of BPAE-CC is as follow, Control Example 2:

(2-nitro-1,3-phenylene)bis(methylene) diacrylate (349 mg, 1.2 mmol) and 4-amino-1-butanol (89 mg, 1 mmol) were reacted at 50° C. for 12 h under solvent-free conditions. Then 1-(3-aminopropyl)-4-methylpiperazine (157 mg, 1 mmol) in dichloromethane (DCM,1 mL) was added and stirred at RT overnight. Then settled three times with glacial ether, removed the solvent under vacuum, and isolated as a yellowish liquid was linear counterpart (LPAE-NB). As a positive control, FIG. 4 shows the 1H NMR spectrum. The chemical structure of LPAE-NB is as follow, FIG. 5 shows the results of GPC in Example 2, Control Example 1, Control Example 2; data analysis shows that the molecular weights of Example 2, Control Example 1 and Control Example 2 have no significant difference.

Control Example 3:

(2-nitro-1,3-phenylene)bis(methylene) diacrylate (174 mg, 0.6 mmol), trimethylol-propane triacrylate (74 mg, 0.25 mmol) and 4-amino-1-butanol (89 mg, 1 mmol) were reacted at 70° C. for 8 h under solvent-free conditions. Then 1-(3-aminopropyl)-4-methylpiperazine (157 mg, 1 mmol) in dichloromethane (DCM, 1 mL) was added and stirred at RT for 12 h. Then settled three times with glacial ether, removed the solvent under vacuum, and isolated as a yellowish gel. The gel was insoluble in solutions such as acetate buffer and could not be used for later characterization experiments and nucleic acid coating.

Example 3

Preparation, Characterization and Performance of DNA Nano-Medicine

With the concentration was at 1 mg/mL of BPAE-NB prepared in Example 2 and acetate buffer solution (pH=5.2) and the concentration of DNA at 0.1 mg/mL (plasmid DNA, luciferase expression plasmid extracted from *E. coli*, conventional products) to prepare DEPC aqueous solution; then DNA and BPAE-NB are mixed at various weight ratios (1/0.5, 1/1, 1/5, 1/10 and 1/15), the mixture is vortexed 10s, incubated at 37° C. for 30 min to form a the BPAE-NB/DNA polyplexes. The polyplexes condensation was qualitatively evaluated using agarose (1%) gel electrophoresis at 100V for 40 min and quantitatively explored using theethidium bromide (EB) exclusion assay that the gel imaging system is used for imaging to determine the efficiency of DNA packaging.

DNA and BPAE-NB are mixed at various weight ratios (1/0.2, 1/0.5, 1/1, 1/2 and 1/5), the mixture is vortexed 10s, incubated at 37° C. for 30 min to form a the BPAE-NB/DNA polyplexes. Divide the BPAE-NB/DNA complex into two groups, one group was irradiated with UV light (365 nm, 20 mW/cm², 5 min) the other group is not illuminated, the polyplexes condensations were qualitatively evaluated using agarose (1%) gel electrophoresis at 100V for 40 min and quantitatively explored using theethidium bromide (EB) exclusion assay that the gel imaging system is used for imaging to determine the efficiency of DNA packaging.

The size and zeta potential of the BPAE-NB/DNA polyplexes at various weight ratios were monitored by dynamic laser scattering (DLS).

The weight ratio of EB solution and DNA were mixed at 10:1, incubated for 1 hour at room temperature. Then added the examples into the EB/DNA mixture according to various weight ratios of BPAE-NB/DNA, and incubated the mixture at room temperature for 30 minutes, and the fluorescence intensities were measured by a microplate reader ($\lambda$ex=510 nm, $\lambda$em=590 nm) to determine the efficiency of DNA packaging.

The UV-triggered DNA release was further explored by the solution incubated at 37° C. for 1 h with heparin at various final concentrations prior to the EB exclusion assay.

HeLa cells on 96-well plates at 1×10⁴ cells per well were cultured in DMEM medium containing 10% FBS for 24 h. Then replaced with serum-free DMEM and added with concentration of BPAE-NB/DNA complex at 0.1 µg DNA/well (w/w=15/1). After incubating for 4 h at 37° C., removed the medium and replaced with fresh medium. The cells are divided into two groups, one group was illuminated (365 nm, 20 mW/cm², 5 min), and the other was not illuminated, and then further incubate for 20 h. The luciferase kit was used to measure the expression of luciferase, and the BCA kit was used to measure the cell protein concentration to evaluate the gene transfection efficiency.

Remarked DNA (each 50 bp DNA is labeled with a dye molecule) with YOYO-1 (20 µmol), and then prepared BPAE-NB/YOYO-1-DNA complexes at various weight ratios. HeLa cells on 96-well plates at 1×10⁴ cells per well were cultured in DMEM medium containing 10% FBS for 24 h. Then replaced with serum-free DMEM and added with concentration of complex at 0.1 µg YOYO-1-DNA/well (w/w=15/1). After incubating for 4 h at 37° C., removed the medium and replaced with fresh medium. The cells were then washed 4 times with cold PBS containing heparin sodium (20 U/mL), to remove non-infected complex. The cellular uptake level of polyplexes was determined by lysing the cells and quantifying the YOYO-1-DNA content in the lysate using spectrofluorimetry ($\lambda$ex=485 nm, $\lambda$em=530 nm). The concentration of protein can be determined using the BCA kit to evaluate the level of cellular uptake.

Observed by confocal laser scanning microscope (CLSM) endosomal entrapment and lysosomal degradation of the gene cargoes at 4×10⁴ cells/dish of Hela cells were seeded on a glass-bottom cell culture dish ($\Phi$=20 mm) and cultured for 24 h. Changed the medium to serum-free DMEM, added RBITC-polymer/YOYO-1-DNA complex (w/w=15, 1 µg YOYO-1-DNA/dish), incubated at 37° C. for 4 h, The cells were then washed 3 times with cold PBS containing heparin sodium (20 U/mL), Hochest 33258 staining (5 µg/mL, 30 min), observed the cells with a CLSM was further utilized to evaluate the intracellular DNA release from polyplexes composed of RBITC-labeled BPAE-NB and YOYO-1-DNA. Fluorescence intensity was observed by laser confocal microscope.

HeLa cells on 96-well plates at 2.5×10⁴ cells per well were incubated for 24 h. Then replaced with serum-free DMEM and added BPAE-NB polyplexes at various concentrations for 4 h at 37° C. The cells were further incubated in serum-containing medium for 20 h, and the cell viability was determined by the MTT assay.

HeLa cells on 96-well plates at 2.5×10⁴ cells per well were incubated for 24 h. Then replaced with serum-free DMEM and added BPAE-NB/DNA polyplexes at various weight ratios in 0.3 μg DNA/well for 4 h at 37° C. The cells were further incubated in serum-containing medium for 20 h, and the cell viability was determined by the MTT assay.

Figure 6:
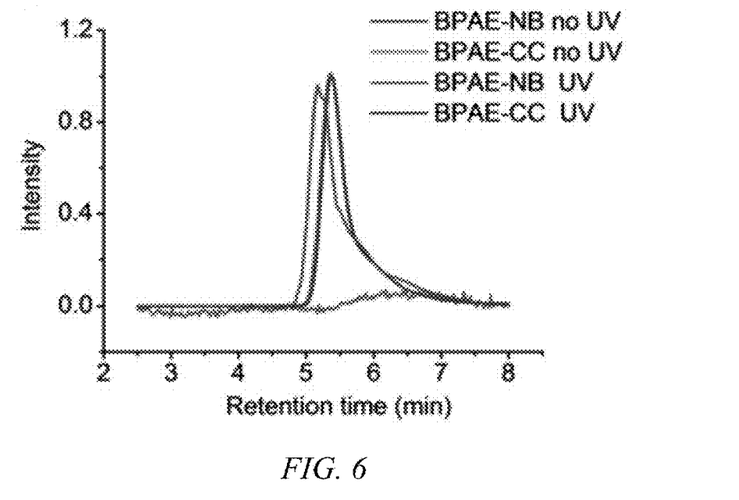
FIG. 6 shows the GPC spectrum of Example 2 and Control Example 1 before and after UV light irradiation.

The BPAE-NB of Example 2 was replaced with BPAE-CC of Control Example 1 and LPAE-NB of Control Example 2. Compared with existing polymers, the results are as follows:

FIG. 6 shows the GPC spectrum of Example 2 and Control Example 1 before and after UV light irradiation (365 nm, 20 mW/cm², 5 min). With data analysis the chromatographic peak almost disappeared after UV irradiation in Example 2, while the chromatographic peak of Control Example 1 did not change significantly. This shows that the molecular weight of Example 2 is significantly reduced after UV light treatment, while the molecular weight of Control Example 1 is basically unchanged, which proves the UV light sensitivity of BPAE-NB.

Figure 7:
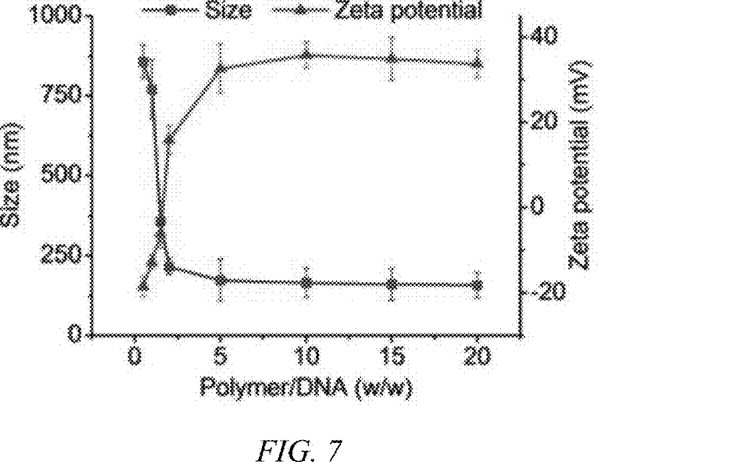
FIG. 7 is a graph of the particle size and potential after the DNA is encapsulated in Example 2.

FIG. 7 is a graph of the particle size and potential after the DNA is encapsulated in Example 2; Data analysis shows that when the mass ratio is 2, it changes from a negative charge to a positive charge, and the surface potential is about from 15 to 35 mV, the particle size is about from 120 to 170 nm.

Figure 8:
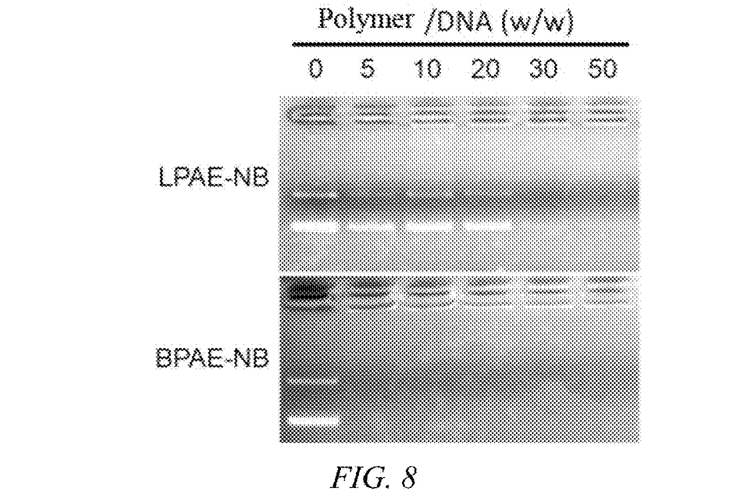
FIG. 8 shows under the different mass ratios gel permeation diagrams of DNA encapsulated in Example 2 and Control Example 2.

FIG. 8 shows under the different mass ratios gel permeation diagrams of DNA encapsulated in Example 2 and Control Example 2; Data analysis shows that when the mass ratio is greater than or equal to 0.5, Example 2 can completely encapsulate DNA. It shows that the poly(β-amino ester)s in Example 2 has stronger binding ability with DNA.

Figure 9:
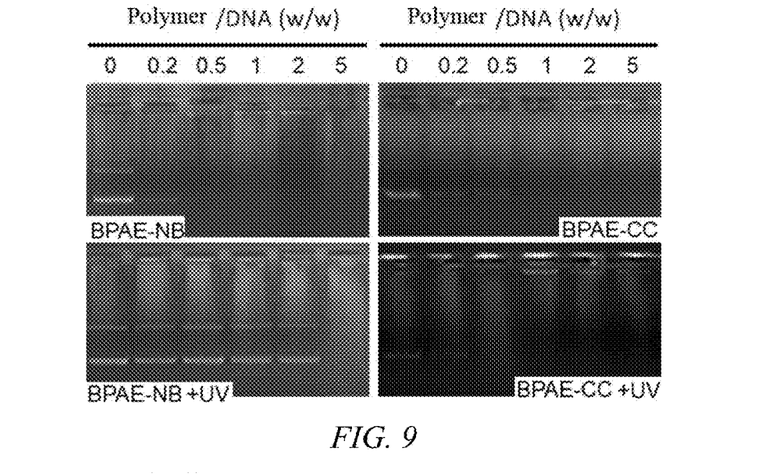
FIG. 9 shows under the different mass ratios gel permeation diagrams of DNA encapsulated before and after UV light irradiation in Example 2 and Control Example 1.

FIG. 9 shows under the different mass ratios gel permeation diagrams of DNA encapsulated before and after UV light irradiation in Example 2 and Control Example 1; Data analysis shows that after illumination, Example 2 can condense DNA only when the mass ratio is 5, while Control Example 1 is DNA can be condensed at the same ratio before and after light. It proves the UV light sensitivity of DNA complex.

Figure 10:
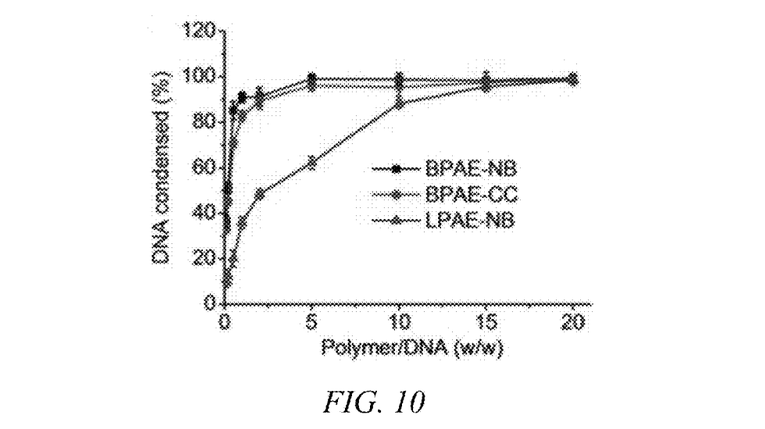
FIG. 10 shows diagrams of DNA encapsulated after ethidium bromide treatment after wrapping DNA in Example 2, Control Example 1 and Control Example 2.

FIG. 10 shows diagrams of DNA encapsulated after ethidium bromide treatment after wrapping DNA in Example 2, Control Example 1 and Control Example 2; From FIG. 10, when the mass ratio of DNA is 2 in Example 2 and Control Example 1 are nearly at 90% of the loading rate. While the mass ratio of DNA is 15 in Control Example 2 is more than 90% of the loading rate.

Figure 11:
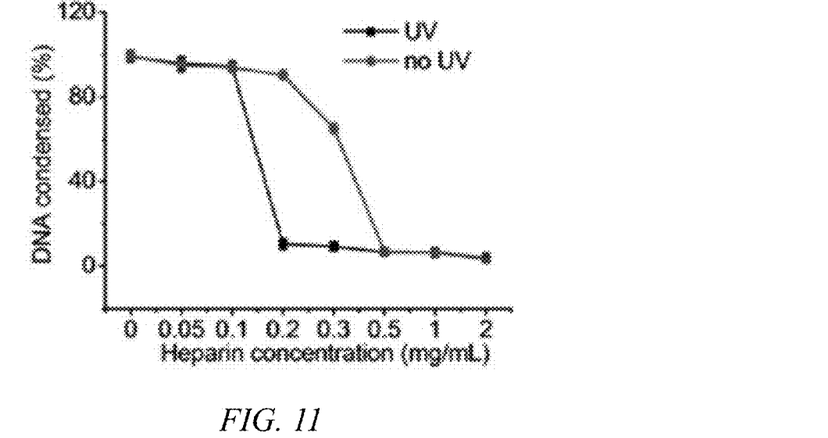
FIG. 11 shows graphs of DNA release after treatment with sodium heparin after DNA in Example 2.

FIG. 11 shows graphs of DNA release after treatment with sodium heparin after DNA in Example 2; It is found from FIG. 11 that when the concentration of positively charged heparin sodium is increased, more DNA will be competitively released. After UV light irradiation, when the concentration of heparin sodium is 0.02 mg/mL, it can compete for most of the DNA, which is beneficial to the UV-triggered DNA release of the drug of the present invention after reaching the diseased site.

Figure 12:
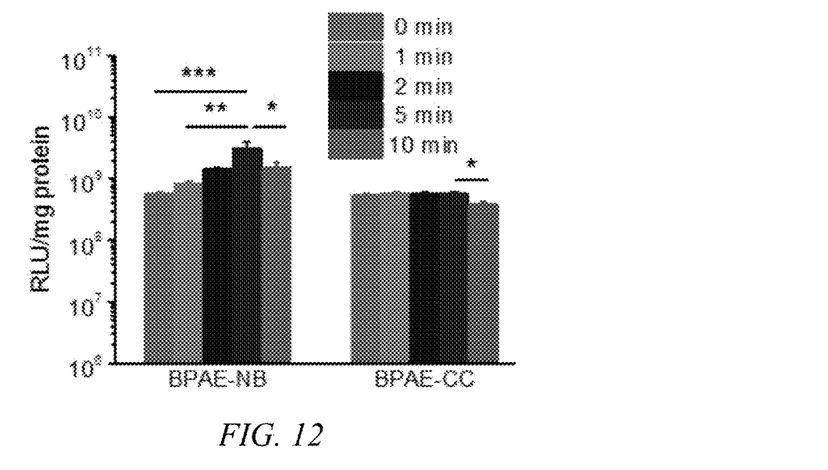
FIG. 12 shows the gene transfection on HeLa cells, in Example 2, Control Example 1 after the DNA is encapsulated in the complex under UV irradiation at different times.

FIG. 12 shows the gene transfection on HeLa cells, in Example 2, Control Example 1 after the DNA is encapsulated in the complex under UV irradiation at different times. From FIG. 12, it can be found that Example 2 and Control Example 1 are in the same state after UV irradiation. At the same mass ratio of nucleic acid drugs, Example 2 has a higher transfection efficiency, especially when UV light is irradiated for 5 minutes, the transfection efficiency is nearly 10 times higher than that of Control Example 1, showing that UV light is responsive to polymer. Promoting effect of β-amino ester transfection.

Figure 13:
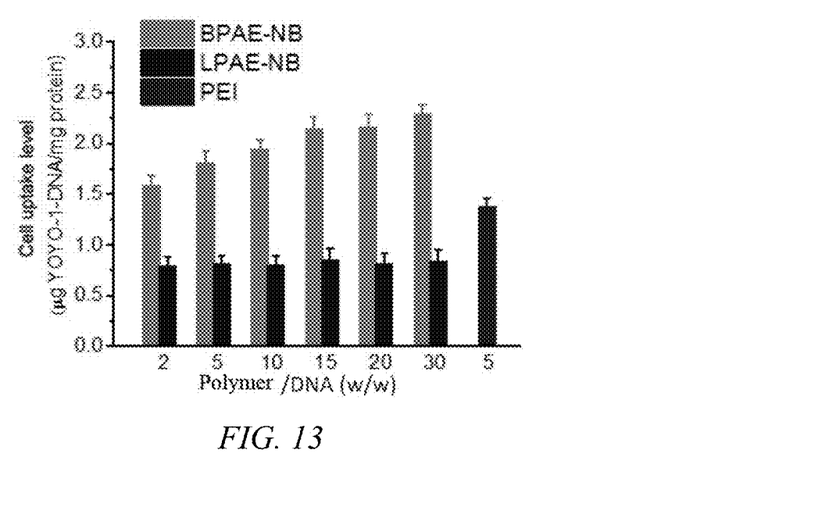
FIG. 13 shows the cell uptake efficiency of the complexes in HeLa cells in Example 2, Control Example 2, and PEI-encapsulated DNA.

FIG. 13 shows the cell uptake efficiency of the complexes in HeLa cells in Example 2, Control Example 2, and PEI-encapsulated DNA. From FIG. 13, it is found that Example 2 has a better cell uptake efficiency than Control Example 2 and PEI.

Figure 14:
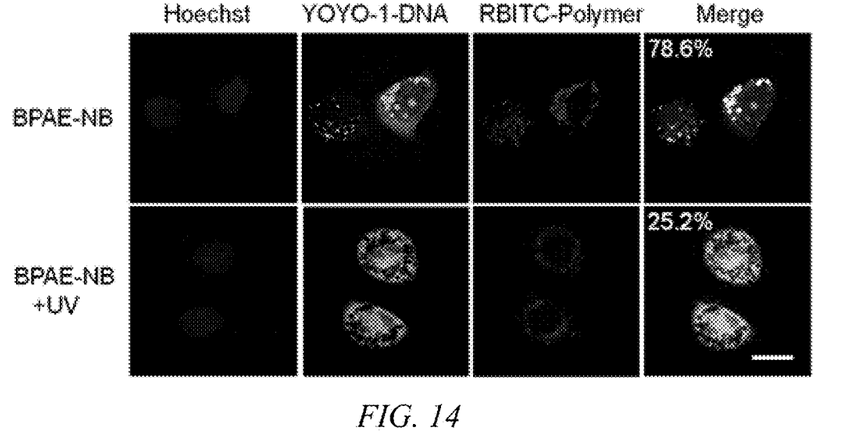
FIG. 14 is a fluorescence image of cell escape before and after UV irradiation in Example 2 on HeLa cells.

FIG. 14 is a fluorescence image of cell escape before and after UV irradiation in Example 2 on HeLa cells. It can be seen from FIG. 14 that after illumination, the overlap of red and green fluorescence is reduced, and the co-localization rate is significantly reduced, which proves that more complexes escape Extrusion of endosomes is conducive to promoting gene transfection.

Figure 15:
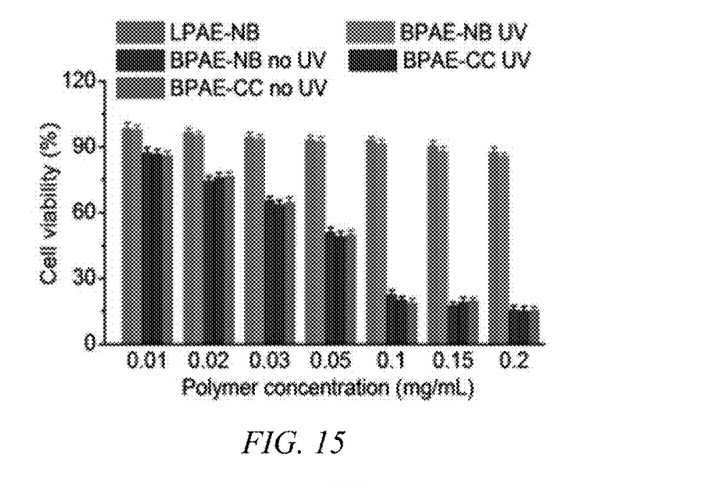
FIG. 15 shows the cytotoxicity of Example 2, Control Example 1 and Control Example 2 before and after UV irradiation on HeLa cells at different concentrations.

FIG. 15 shows the cytotoxicity of Example 2, Control Example 1 and Control Example 2 before and after UV irradiation on HeLa cells at different concentrations. It can be seen from FIG. 15 that as the concentration increases, compared to Control Example 1/DNA complex The Example 2/DNA complex has a higher cell survival rate after UV irradiation than when there is no light, which proves that the material in Example 2 is degraded after UV irradiation, and the detailed toxicity is reduced.

Figure 16:
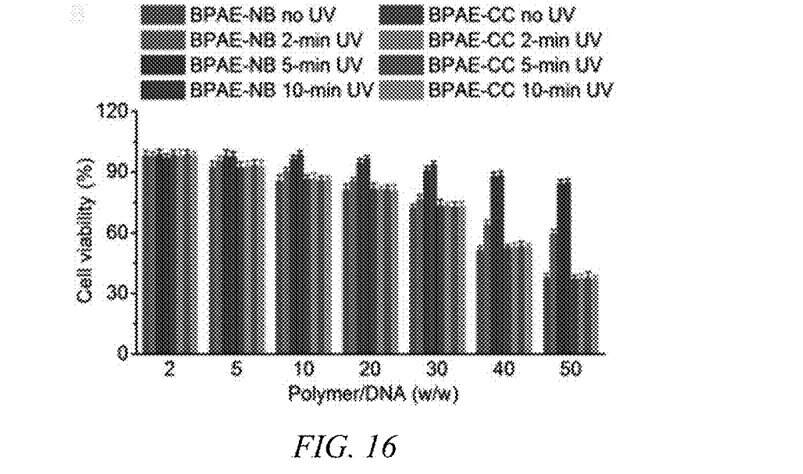
FIG. 16 shows under different UV light time the cytotoxicity of the complexes with DNA wrapped in different proportions on HeLa cells in Example 2, Control Example 1.

FIG. 16 shows under different UV light time the cytotoxicity of the complexes with DNA wrapped in different proportions on HeLa cells in Example 2, Control Example 1. From FIG. 16, it can be found that compared to the complexes of Control Example 1, with With the prolongation of the illumination time, the survival rate of the cells incubated in the complex of Example 2 increased significantly, which proved that the toxicity of the complex of Example 2/DNA was reduced after light exposure and the biocompatibility was improved.

Example 4

Preparation, Characterization and Performance of siRNA-Loaded Nanomedicine

With the concentration was at 1 mg/mL of BPAE-NB prepared in Example 2 and acetate buffer solution (pH=5.2) and the concentration of DNA at 0.1 mg/mL configure Survivin siRNA (siSur, purchased from Gemma Gene (Shanghai, China)) to prepare DEPC aqueous solution; then siRNA and BPAE-NB are mixed at various weight ratios (1/10, 1/20, 1/50, 1/70, 1/100, 1/120 and 1/150), the mixture is vortexed 10s, incubated at 37° C. for 30 min to form a the BPAE-NB/siRNA polyplexes. The polyplexes condensation was qualitatively evaluated using agarose (1%) gel electrophoresis at 100V for 40 min and uantitatively explored using theethidium bromide (EB) exclusion assay that the gel imaging system is used for imaging to determine the efficiency of DNA packaging.

siRNA and BPAE-NB are mixed at various weight ratios (1/2, 1/5, 1/10, 1/15, 1/20 and 1/30), the mixture is vortexed 10s, incubated at 37° C. for 30 min to form a the BPAE-NB/siRNA polyplexes. Divide the BPAE-NB/siRNA polyplexes into two groups, one group was irradiated with UV light (365 nm, 20 mW/cm², 5 min) the other group is not illuminated, the polyplexes condensations were qualitatively evaluated using agarose (2%) gel electrophoresis at 90V for 20 min and uantitatively explored using theethidium bromide (EB) exclusion assay that the gel imaging system is used for imaging to determine the efficiency of siRNA packaging.

The size and zeta potential of the BPAE-NB/siRNA polyplexes at various weight ratios were monitored by dynamic laser scattering (DLS).

Prepared the BPAE-NB/siRNA polyplexes at various weight ratio. HeLa cells on 96-well plates at 1×10⁴ cells per well were cultured in DMEM medium containing 10% FBS for 24 h. Then replaced with serum-free DMEM and added polyplexes at 0.1 µg FAM-siRNA into the holes. With PEI/FAM-siRNA polyplexes (w/w=5:1) as a control, and incubated for 4 h. The cells were then washed 3 times with cold PBS containing heparin sodium, added RIPA lysis buffer (100 µL) for lysis, measured the content of FAM-siRNA (λex=480 nm, λem=530 nm) with a microplate reader, and measured the cells with BCA kit Internal protein content to study the cell uptake efficiency of β-aminoester/siRNA.and then further incubate for 20 h.

HeLa cells on 6-well plates at $5 \times 10^4$ cells per well were in DMEM medium containing 10% FBS for 24 h. Then replaced with serum-free DMEM and added BPAE-NB/siSur polyplexes (w/w=30/1) was added to the concentration of siRNA at 2 µg/mL. With the PEI/siSur complex (w/w=5/1), BPAE-NB/siNC polyplexes (w/w=30/1) as a control, incubated for 4 h. Subsequently, the culture medium contained 10% FBS in DMEM medium, light (365 nm, 20 mW/cm², 5 min). The cells were further incubated in serum-containing medium for 20 h, and the expression level of Survivin mRNA was detected by real-time quantitative fluorescent PCR.

HeLa cells on 96-well plates at $2.5 \times 10^4$ cells per well were incubated for 24 h. Then replaced with serum-free medium, and add the Example 2/siSur polyplexes (w/w=30/1) according to the different siRNA concentration in each well. Take the Example 2/siNC complex (w/w=30/1) as a control, incubate at 37° C. for 4 hours, discard the complex after light (365 nm, 20 mW/cm², 5 min), and replaced it with 10% FBS after 48 hours of culture in DMEM medium. The cell survival rate was determined by MTT method.

Figure 17:
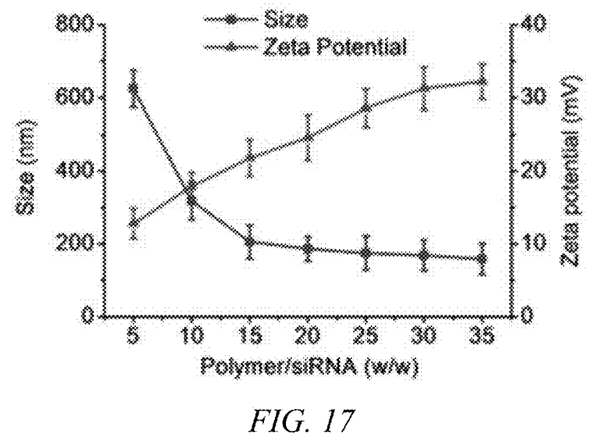
FIG. 17 shows particle size and potential after encapsulating siRNA in Example 2.

The BPAE-NB of Example 2 was replaced with the BPAE-CC of Control Example 1 and the LPAE-NB of Control Example 2. Compared with the existing polymer, the results are as follows:

FIG. 17 shows particle size and potential after encapsulating siRNA in Example 2. Data analysis shows that the polymer of the present invention. When the mass ratio of β-amino ester to nucleic acid drug is 5, it changes from negative charge to positive charge, the surface potential is about from 12 to 35 mV, and the particle size is about from 130 to 180 nm.

Figure 18:
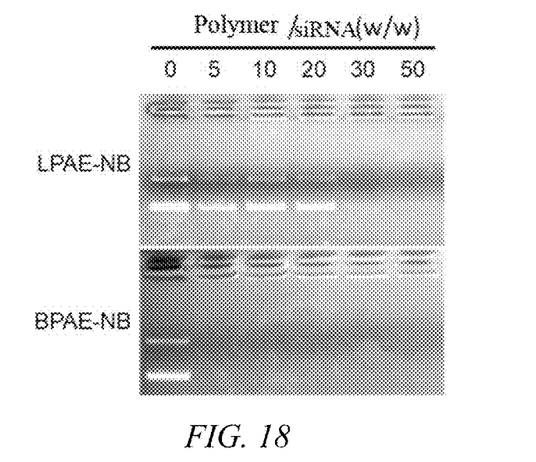
FIG. 18 shows under the different mass ratios gel permeation diagrams of siRNA encapsulated in Example 2 and Control Example 2.

FIG. 18 shows under the different mass ratios gel permeation diagrams of siRNA encapsulated in Example 2 and Control Example 2. According to analysis, when the mass ratio is greater than or equal to 15, Example 2 can completely encapsulate siRNA. It shows that the poly(β-amino ester)s in Example 2 has stronger binding ability with siRNA.

Figure 19:
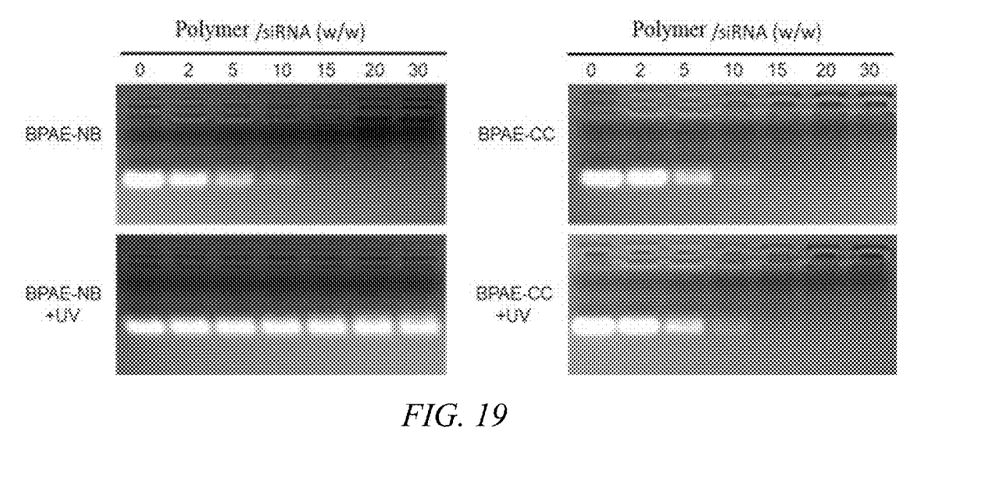
FIG. 19 shows under the different mass ratios gel permeation diagrams of siRNA encapsulated before and after UV light irradiation in Example 2 and Control Example 1.

FIG. 19 shows under the different mass ratios gel permeation diagrams of siRNA encapsulated before and after UV light irradiation in Example 2 and Control Example 1. According to analysis, after illumination, Example 2 cannot effectively condense siRNA when the weight ratio is 30. In Control Example 1, siRNA can be condensed at the same weight ratio before and after light. The UV light sensitivity of Example 2/siRNA polyplexes is proved.

Figure 20:
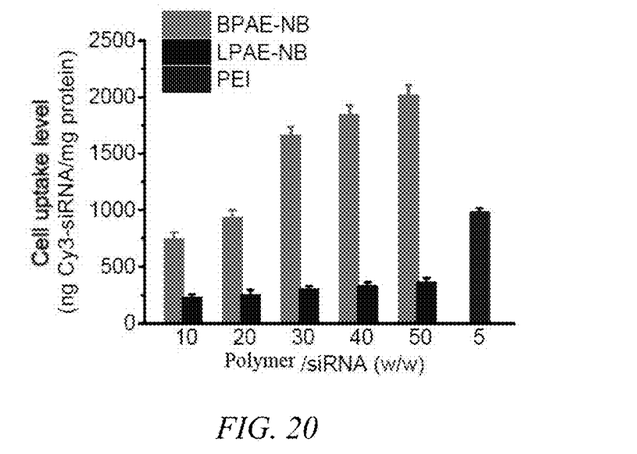
FIG. 20 shows the cell uptake efficiency of the complexes in HeLa cells in Example 2, Control Example 2, and PEI-encapsulated siRNA.

FIG. 20 shows the cell uptake efficiency of the complexes in Hela cells in Example 2, Control Example 2, and PEI-encapsulated siRNA. According to analysis, Example 2 has a better cell uptake efficiency than Control Example 2 and PEI.

Figure 21:
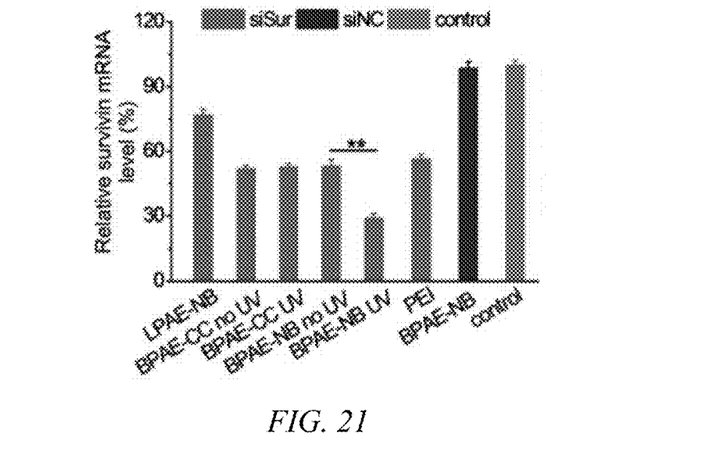
FIG. 21 shows the relative survivin mRNA expression levels of the Hela cells in Example 2, Control Example 1, Control Example 2, and PEI-encapsulated survivin siRNA before and after light.

FIG. 21 shows the relative survivin mRNA expression levels of the HeLa cells in Example 2, Control Example 1, Control Example 2, and PEI-encapsulated survivin siRNA before and after light. In the figure, HeLa cells without any treatment are used as a control. According to the analysis, compared with Control Example 1, Control Example 2 and PEI, Example 2 can reduce the expression level of survivn mRNA by more than 70% after light, while Example 2 can only reduce the level of survivn mRNA by about 50% without light. survivn mRNA level, which confirms that UV light irradiation greatly enhances BPAE-NB-mediated gene silencing, which is the result of light-triggered intracellular siRNA release, which proves the advantages of the poly-β-aminoester of Example 2 in gene delivery.

Figure 22:
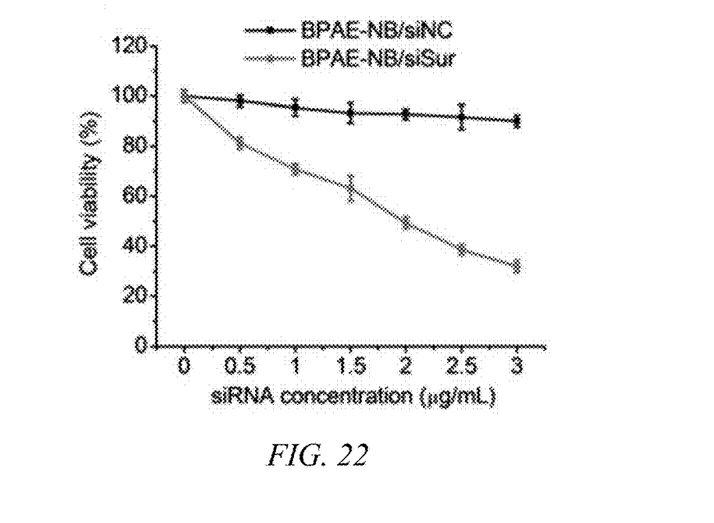
FIG. 22 shows the cell viability of HeLa cells in Example 2/siSur complex and Example 2/siNC complex after being transfected with Hela cells at different concentrations on HeLa cells after illumination.

FIG. 22 shows the cell viability of HeLa cells in Example 2/siSur complex and Example 2/siNC complex after being transfected with Hela cells at different concentrations on HeLa cells after illumination. According to analysis, after illumination, use Example 2 The cell viability of Hela cells transfected with the/siSur complex decreased significantly with the increase of the concentration of the complex, and Example 2/siNC complex did not show detailed cytotoxicity when the encapsulated siRNA concentration was 3 µg/mL. Therefore, it was confirmed that the successful down-regulation of Survivin mediated by BPAE-NB can significantly kill HeLa cells.

The UV-responsive branched poly(β-amino ester)s provided by the present invention was utilized to form the highly branched architecture, and a UV light-responsive group that can be used as a nucleic acid carrier and has good biocompatibility and UV light sensitivity. As well as high gene transfection ability, it has good application prospects in nucleic acid drug delivery systems.

The invention claimed is:

1. UV-responsive branched poly(β-amino ester)s, having the chemical structure of Formula (I):

Formula (I)

-continued wherein, x is from 7 to 15, y is from 7 to 13, z is from 6 to 10.

2. A method of preparing UV-responsive branched poly(β-amino ester)s of claim 1, comprising the following steps: prepare the UV-responsive branched poly(β-amino ester)s with 4-amino-1-butanol, (2-nitro-1,3-phenylene)bis(methylene) diacrylate, trimethylolpropane triacrylate, 1-(3-aminopropyl)-4-methylpiperazine as raw materials.

3. The method of claim 2, comprising reacting 4-amino-1-butanol, (2-nitro-1,3-phenylene)bis(methylene) diacrylate, and trimethylolpropane triacrylate at from 50° C. to 60° C., and then adding 1-(3-aminopropyl)-4-methylpiperazine at room temperature, to prepare the UV-responsive branched poly(β-amino ester)s.

4. The method of claim 2, wherein a molar ratio of (2-nitro-1,3-phenylene)bis(methylene) diacrylate, trimethylolpropane triacrylate, 4-amino-1-butanol, 1-(3-aminopropyl)-4-methylpiperazine is 0.6:0.25:1:1, and a reaction of 2-nitro-1,3-phenylene)bis(methylene) diacrylate and trimethylolpropane triacrylate is conducted at from 50° C. to 60° C. for 5 to 8 h, a reaction time at room temperature is 10 to 15 h; 2-nitro-1,3-phthalic acid is prepared with 2,6-dimethylnitrobenzene and an oxidant as raw materials; 2-nitro-1,3-benzenedimethanol is prepared with 2-nitro-1,3-phthalic acid and borane as raw materials; and (2-nitro-1,3-phenylene)bis(methylene) diacrylate is prepared with 2-nitro-1,3-benzene-dimethanol and acryloyl chloride as raw materials.

5. The method of claim 4, wherein the oxidant is potassium permanganate; and (2-nitro-1,3-phenylene)bis(methylene) diacrylate is prepared under the catalysis of an amine and with 2-nitro-1,3-benzenedimethanol and acryloyl chloride as raw materials.

6. A method for preparing a nano-medicine, comprising combining the UV-responsive branched poly(β-amino ester)s of claim 1 with a drug to prepare the nano-medicine.

7. A nano-medicine, comprising a combination of UV-responsive branched poly(β-amino ester)s of claim 1 and a drug.

8. The nano-medicine of claim 7, wherein the drug is a nucleic acid; a mass ratio of UV-responsive branched poly(β-amino ester)s and nucleic acid is (0.5 to 50):1.

9. The nano-medicine of claim 7, wherein a particle size of the drug is from 120 to 170 nm; a zeta potential of nano-medicine is from 15 to 35 mV.

* * * * *